United States Patent Office 3,290,346
Patented Dec. 6, 1966

3,290,346
PROCESS FOR PREPARING CARBOXYCYCLOPENTADIENYL MANGANESE TRICARBONYL
John Kozikowski, Walled Lake, Mich., and Michael Cais, Haifa, Israel, assignors to Ethyl Corporation, New York, N.Y., a corporation of Virginia
No Drawing. Original application Dec. 28, 1960, Ser. No. 78,820. Divided and this application May 3, 1965, Ser. No. 463,418
3 Claims. (Cl. 260—429)

This application is a division of application Serial No. 78,820, filed December 28, 1960. This invention relates to a variety of organometallic compounds and the processes employed in their production. More specifically, this invention relates to compounds and processes involving the use of an acylcyclopentadienyl manganese tricarbonyl compound.

An object of our invention is to provide new organometallic compounds and processes for their preparation. A further object is to provide acylcyclopentadienyl manganese tricarbonyl derivatives and processes for their preparation. Additional objects will become apparent from a reading of the specification and claims which follow.

The objects of this invention are accomplished by providing a new process for the preparation of carboxycyclopentadienyl manganese tricarbonyl. In the process of our new invention we employ a 1-[2-oxo-2-(tricarbonylmanganocyclopentadienyl)ethyl]pyridinium halide which has the following formula:

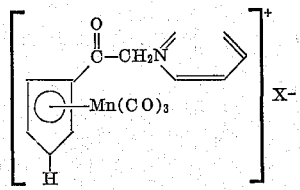

in which X is a halogen. The pyridine group, although not illustrated as such, can be substituted with hydrocarbon groups. 1-[2-oxo-2-(tricarbonylmanganocyclopentadienyl)ethyl]pyridinium halide salts can be reacted with an equimolar quantity of a base to form an enolbetaine compound having the following formula:

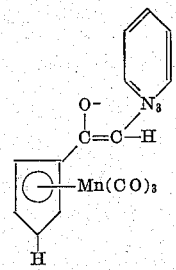

in which the pyridine ring can be substituted with hydrocarbon groups. In the course of this reaction, a hydro halogen acid is formed. The type of acid formed is determined by the halogen anion in the pyridinium salt reactant. If, for example, the anion is bromine, the acid formed will be hydrogen bromide. The purpose of the base in the reaction is to neutralize the hydro halogen acid which is formed. Generally, the reaction can be conveniently carried out by heating the reaction mixture at the reflux temperature of the system. This aspect of our invention is illustrated more fully by way of the following example in which all parts and percentages are by weight unless otherwise indicated.

EXAMPLE I

To 8.08 grams (0.02 mole) of 1-[2-oxo-2-(tricarbonylmanganocyclopentadienyl)ethyl]pyridinium bromide dissolved in 125 ml. of water was added 0.8 gram (0.02 mole) of sodium hydroxide in 10 ml. of water dropwise with stirring. A precipitate forms after the first drop of sodium hydroxide is added. When first formed, the precipitate is yellow and then immediately turns orange. Stirring is continued for ½ hour after addition is complete. The reaction mixture is then filtered, washed with water, and dried over $P_2O_5$ in a vacuum desiccator. The yield of orange amorphous solid is 6.2 grams or 96 percent of theory. This material, 1-[2-oxo-2-(tricarbonylmanganocyclopentadienyl)ethyl]pyridinium enolbetaine, darkens at 169° C. and melts with decomposition at 171–174° C. The Beilstein test for halogen is negative.

Analysis.—Calcd. for $C_{15}H_{10}MnO_4N$: Mn, 17.0; H, 3.09; N, 4.34. Found: Mn, 17.0; H, 3.2; N, 3.84 percent. When the enolbetaine was dissolved in acetone it gave a bright orange color. Anhydrous hydrogen bromide in acetone was added until this color disappeared and there was regenerated the pyridinium salt. Boiling the compound in distilled water failed to dissolve it or affect it in any way. It was soluble to some extent in most organic solvents.

When two moles of base is used in the process just described, a salt of carboxycyclopentadienyl manganese tricarbonyl is formed. The salt, as illustrated by the sodium salt of carboxycyclopentadienyl manganese tricarbonyl, can then be acidified to yield carboxycyclopentadienyl manganese tricarbonyl. The acidification reaction is performed readily by mixing an acid which is stronger than carboxycyclopentadienyl manganese tricarbonyl with the salt of carboxycyclopentadienyl manganese tricarbonyl. Both the formation of the salt and its acidification to form the carboxy acid of cyclopentadienyl manganese tricarbonyl are illustrated by the following examples.

EXAMPLE II

When 4.8 grams (0.12 mole) of sodium hydroxide in 50 ml. of water was added dropwise with stirring to 21.9 grams (0.054 mole) of 1-[2-oxo-2-(tricarbonylmanganocyclopentadienyl)ethyl]pyridinium bromide in 300 ml. of water a voluminous orange precipitate formed. The mixture was then heated to boiling for 15 minutes during which time the solids dissolved. It was then cooled, saturated with NaCl, acidified to a Congo red end point, and extracted with ether. Solvent was removed by distillation, yield 13.2 grams, 98.6 percent of theory, of carboxycyclopentadienyl manganese tricarbonyl having a melting point of 190–194° C. Recrystallization from toluene raised the M.P. to 195–196.5° C. This acid can also be prepared by treating the enolbetaine compound with NaOH on a mole for mole basis under similar conditions. When the preceding reactions were carried out using only a minimum of isolation procedures the acid can be obtained in 78.5 percent starting from acetylcyclopentadienyl manganese tricarbonyl. The acid is virtually completely insoluble in many organic solvents such as, benzene and toluene at room temperature and in boiling carbon tetrachloride.

Analysis.—Calcd. for $C_9H_5MnO_5$: C, 43.5; H, 2.18; Mn, 22.2. Found: C, 43.7; H, 2.12, Mn, 21.9 percent.

The carboxycyclopentadienyl manganese tricarbonyl, formed as in the preceding example, can then be reacted with a compound such as phosphorus pentachloride, phosphorus trichloride or thionyl chloride to form a halocarbonylcyclopentadienyl manganese tricarbonyl. This reaction is customarily carried out in the presence of a non-reactive solvent. Some heating of the reaction mixture is necessary to initiate the reaction. To further illustrate this species of our invention, there is presented the following example.

EXAMPLE III

A mixture of 5 grams (0.0202 mole) of carboxycyclopentadienyl manganese tricarbonyl, 5 ml. of thionyl chloride and 50 ml. of carbon tetrachloride was heated to reflux for 45 minutes in a nitrogen atmosphere. A dark green solution resulted. The solvent and excess thionyl chloride were removed by distillation under reduced pressure. The crude product, which was chloroacetylcyclopentadienyl manganese tricarbonyl, weighed 5.25 grams, 98.5 percent of theory, and had a M.P. of 57–60° C. One recrystallization from petroleum ether (B.P. 30–60° C.) raised the melting point to 58–60° C.

*Analysis.*—Calcd. for $C_9H_4MnOCl$: C, 40.6; H, 1.50; Mn, 20.5; Cl, 13.3. Found: C, 40.9; H, 1.58; Mn, 20.6; Cl, 13.4 percent.

The reaction was then repeated using phosphorous pentachloride as the chlorinating agent. A mixture of finely ground $PCl_5$ (6.25 grams, 0.03 mole) and carboxycyclopentadienyl manganese tricarbonyl (7.44 grams, 0.03 mole) was warmed gently to start the reaction. After the initial vigorous reaction had subsided, heating on a steam bath was resumed for ½ hour. Then 100 ml. of benzene was added and the $POCl_3$ formed in the reaction was removed by codistillation under reduced pressure. Recrystallization from petroleum ether yielded 6.5 grams, 81.4 percent yield of chlorocarbonylcyclopentadienyl manganese tricarbonyl having a melting point of 58–60° C.

The preparation of related cyclopentadienyl manganese tricarbonyl compounds is fully described in our copending application Serial No. 78,820, filed December 28, 1960.

Among the important uses of our compounds is their use as fuel and oil additives. For example, they are useful antiknocks when added to gasoline. They may be used as primary antiknocks in which they are the major antiknock component in the fuel or as supplemental antiknocks. When used as supplemental antiknocks, they are present as the minor antiknock component in the fuel in addition to a primary antiknock such as a tetraalkyllead compound. Typical alkyllead compounds are tetraethyllead, tetrabutyllead, tetramethyllead and various mixed lead alkyls such as dimethyldiethyllead, diethyldibutyllead and the like. When used as either a supplemental or primary antiknock, our compounds may be present in the gasoline in combination with typical scavengers such as ethylene dichloride, ethylene dibromide, tricresylphosphate, trimethylphosphate and the like.

The compounds of our invention have further utility as additives to residual and distillate fuels generally, e.g., jet fuels, home heater fuels and diesel fuels, to reduce smoke and/or soot formation. Also, they may be employed as additives to lubricating oils in which case they act to improve the lubricity of the base oil. In addition, they may be employed as additives to solid fuels to control burning rate.

Our compounds are further useful in many metal plating applications. In order to effect metal plating using the compounds, they are decomposed in an evacuated space containing the object to be plated. On decomposition, they lay down a film of metal on the object. The gaseous plating may be carried out in the presence of an inert gas so as to prevent oxidation of the plating metal or the object to be plated during the plating operations.

The gaseous plating technique described above finds wide application in forming coatings which are not only decorative but also protect the underlying substrate material.

Deposition of metal on a glass cloth illustrates the applied process. A glass cloth band weighing one gram is dried for one hour in an oven at 150° C. It is then placed in a tube which is devoid of air and there is added to the tube 0.5 gram of bromoacetylcyclopentadienyl manganese tricarbonyl. The tube is heated at 400° C. for one hour after which time it is cooled and opened. The cloth has a uniform metallic grey appearance and exhibits a gain in weight of about 0.02 gram.

A further utility for our compounds is as drying agents in which case the compounds are incorporated in paints, varnish, printing inks, synthetic resins of the drying oil type, oil enamels and the like. A still further utility for our compounds is their use as chemical intermediates in the preparation of metal-containing polymeric materials or in the preparation of new organic materials.

Having fully defined the novel compounds of our invention, their mode of preparation and their many utilities, we desire to be limited only within the lawful scope of the appended claims.

We claim:

1. Process comprising reacting 1 mole of a 1-[2-oxo-2 - (tricarbonylmanganocyclopentadienyl) ethyl]pyridinium halide compound with 2 moles of a base.

2. The process of claim 1 in which the product formed is acidified to yield carboxycyclopentadienyl manganese tricarbonyl.

3. The process comprising reacting 1 mole of 1-[2-oxo - 2 - (tricarbonylmanganocyclopentadienyl)ethyl]pyridinium bromide with 2 moles of sodium hydroxide to form the sodium salt of carboxycyclopentadienyl manganese tricarbonyl.

References Cited by the Examiner

UNITED STATES PATENTS 2,683,157   7/1954   Weinmayr _____ 260—429

OTHER REFERENCES

Cais et al., Chem. and Ind. (London), Feb. 20, 1960, p. 202.

Cotton et al., Chem. and Ind. (London), 1958, pp. 1368–9.

Reimschneider et al., Z. Naturforsdr. 15*b*, pp. 627–8 (October 1960).

TOBIAS E. LEVOW, *Primary Examiner.*

T. L. IAPALUCCI, A. P. DEMERS,
*Assistant Examiners.*